United States Patent Office 3,083,350
Patented Mar. 26, 1963

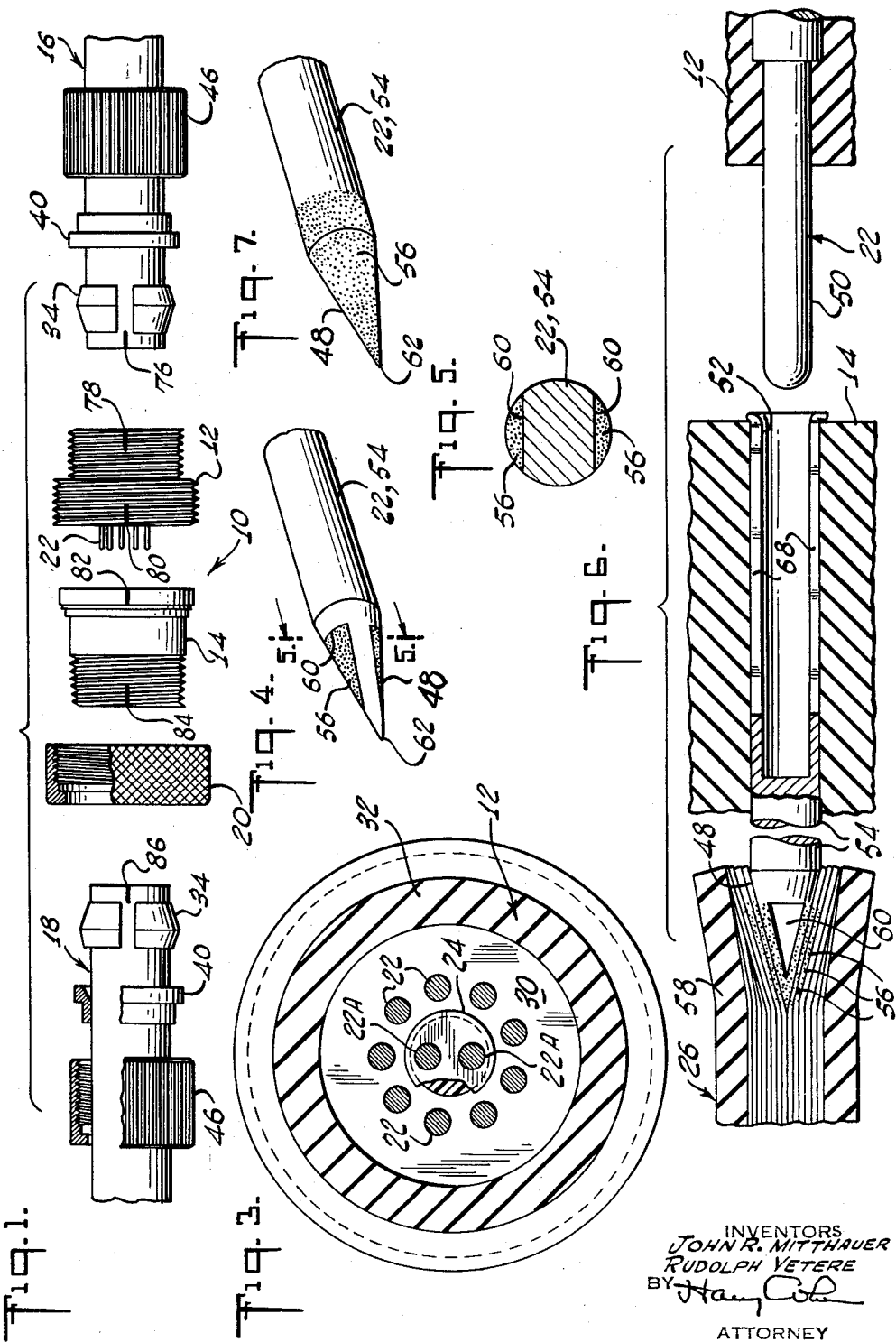

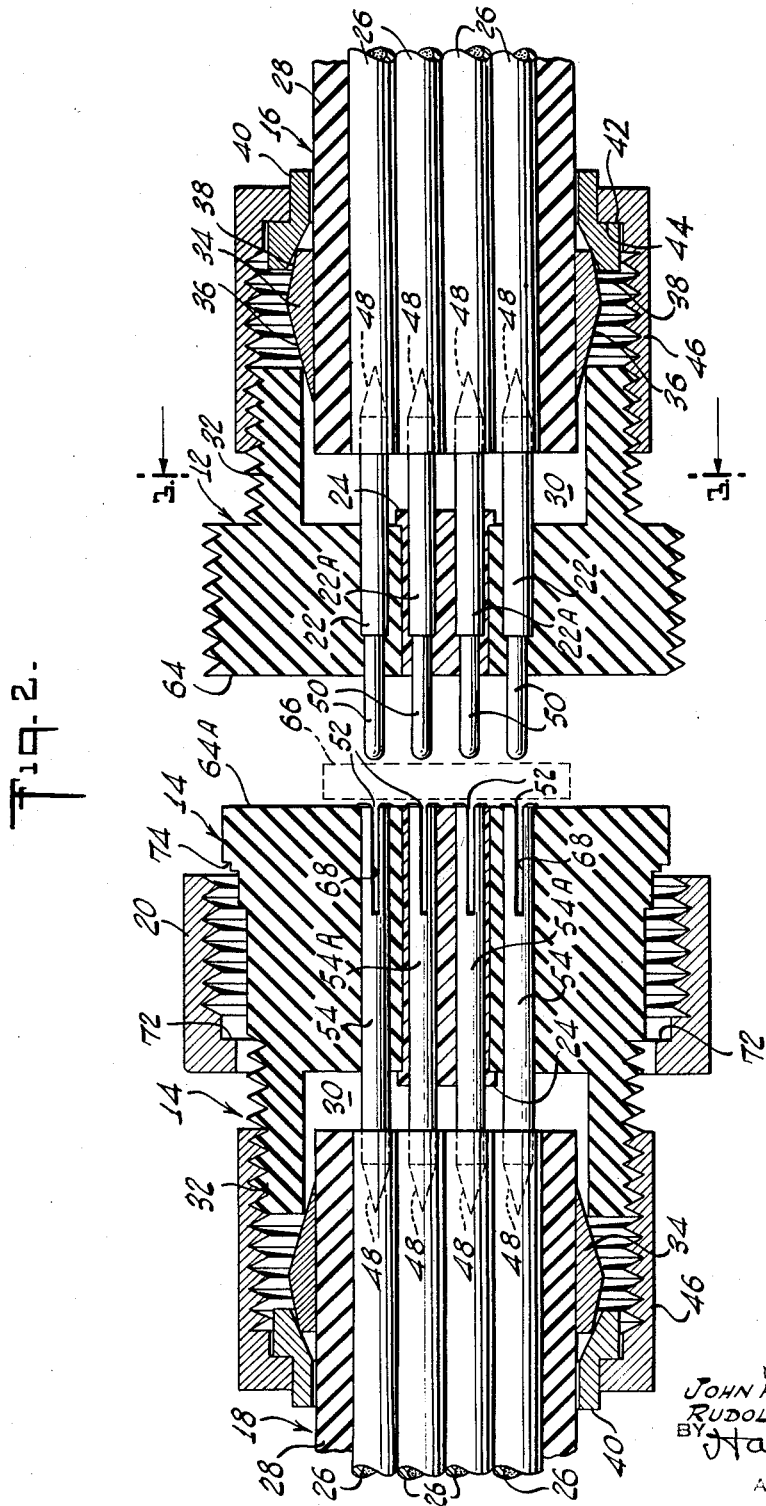

3,083,350
MEANS FOR AND METHOD OF CONNECTING STRANDED ELECTRIC WIRES AND/OR STRANDED WIRE CABLES
John R. Mitthauer, 630 Victory Blvd., and Rudolph Vetere, 49 Sheradan Ave., both of Staten Island, N.Y.
Filed May 5, 1960, Ser. No. 27,084
2 Claims. (Cl. 339—100)

This invention relates to means for and a method of connecting stranded insulated electric wires to each other and/or stranded wire cables to each other in electrically conducting relation with the strands of the electric wires or cables being soldered to parts of the connecting means.

One of the objects of the present invention is to provide means for and a method of connecting stranded wires or cables to each other by a soldered connection without the necessity of stripping any of the insulation from the wires or cables.

A further object is to provide an end or terminal connector for a stranded wire which is adapted to be connected to the wire by a soldered connection without the necessity of stripping any of the insulation from the wire.

Another object is to provide a connector for stranded wire cables which has movable pin members which permit proper orientation of the connector with the stranded wires of the associated or companion cables.

The above and other objects, features and advantages of this invention will be fully understood from the following description of the invention considered in connection with the accompanying illustrative drawings.

In the drawings:

FIG. 1 is an exploded side elevational view, partly in section, showing the parts of the connector of the present invention and the electric stranded wire cables in disassembled condition;

FIG. 2 is an enlarged longitudinal sectional view illustrating the manner in which the terminal members are soldered to the stranded wires;

FIG. 3 is a cross-sectional view taken on the line 3—3 of FIG. 2;

FIG. 4 is a perspective view showing one end portion of a pin member in accordance with the present invention;

FIG. 5 is a sectional view, on a larger scale, taken on line 5—5 of FIG. 4;

FIG. 6 is an exploded view, in section, illustrating the soldered connection between the pin member and the end of a stranded electric wire; and FIG. 7 is a perspective view of the pointed end of a pin member in accordance with another embodiment of the invention.

In accordance with the invention, briefly described, a pin member is provided for each stranded wire. One end of the pin member is tapered or pointed and is provided with solder while the other end of the member comprises a connecting part which is adapted to cooperate with a connecting part of another pin member for a corresponding stranded wire to connect the two wires together. The pointed end of the pin member is inserted endwise into the associated stranded wire and heat is applied to the exposed other end of the pin member to melt the solder and thereby form a soldered connection between the pointed end and the stranded wire. To connect two stranded wires together the other ends of the pin members, respectively, of the stranded wires are connected to each other, whereby a removable connection is provided between the stranded wires without the necessity of stripping any of the insulation from the wires during the soldering thereof to the respective pin members. It will be understood that the invention applies to individual stranded wires which are to be connected together and to cables which include a plurality of stranded wires. In addition, the pin member may provide a terminal or end connector for an individual stranded wire.

Referring now to the drawings in detail and particularly to FIG. 1, the connector 10 of the present invention includes connector members 12 and 14, connector member 12 being adapted to be connected to cable 16 and connector member 14 being adapted to be connected to cable 18. The connector members are adapted to be connected to each other and retained in said connected relation by nut 20 and in this manner the cables are connected together.

Referring to the other figures of the drawings, it is seen that connector member 12 is of tubular shape and is provided with a plurality of pin members 22 which are arranged in a circle in the connector member. Disposed inwardly of pin members 22 is a pair of pin members 22A which are mounted in a plug 24 disposed along the longitudinal axis of connector member 12. The pin members correspond in numbers to the stranded electric wires 26 which are arranged in insulating sheath 28 of cable 16 in a similar pattern as the pin members.

The end of cable 16 is disposed in the open ended recess 30 which is formed by the shank portion 32 of connector member 12. The outer surface of insulating sheath 28 is provided with a split clamping ring 34 which has inclined surfaces 36 and 38. A continuous ferrule 40 engages the outer end of clamping ring 34 and is provided with a shoulder 42 which is in abutment with shoulder 44 of clamping nut 46. The clamping nut is internally threaded and engages the outer threads of shank portion 32 so that upon tightening the clamping nut the end of cable 16 is secured in recess 30 of connector member 12. In a similar manner cable 18 is secured in recess 30 of tubular shaped connector member 14.

Each of the pin members 22 includes a tapered or pointed end 48 and the other end of the pin member is constituted by a plug 50 which is adapted to be inserted into the socket 52 of a corresponding pin member 54 provided in the associated connector member 14. Pin members 22 and 54 are the same except for the coacting plug and socket ends 50 and 52, respectively. The pointed end 48 of each pin member is disposed endwise into the strands of the corresponding stranded wire of the associated cable, as shown in FIGS. 2 and 6, and each pointed end is provided with solder 56 to provide a soldered connection between the pointed end of the pin member and the strands of the companion or corresponding wire. This soldered connection is provided without the necessity of stripping any of the insulation 58 of the corresponding wire 26.

Referring now to FIGS. 4 and 5, pointed end 48 of pin members 22 and 54 is provided with diametrically opposed recesses 60 which are filled with solder 56 and it is seen that the end of the recesses do not extend to the tip 62 of the pin member. Therefore, when the pointed end of the pin member is inserted endwise into the strands at the end of the stranded wire for connecting the wire to the pin member, tip 62 is free of solder and presents a hard sharp point to the end of the wire which facilitates ready entry of the pointed end into the wire.

FIG. 7 illustrates the pointed end of a pin member which is provided with a coating of solder in lieu of the solder containing recesses 60 shown in FIGS. 4 and 5. It will be understood that the layer of solder shown in FIG. 7 need not extend to tip 62 but may end inwardly thereof, in the same manner as shown in FIG. 4.

After the wire cables are inserted in the recesses 30 of their respective connector members and the pointed ends 48 are disposed in their corresponding stranded wires 26, respectively, heat is applied to the pin members to melt the solder provided on the pointed ends and thereby form a soldered connection between the pin member and the corresponding stranded wire. In this regard, it is seen that plugs 50 of pin members 22 are exposed and extend outwardly from the end face 64 of associated connector member 12 and sockets 52 of pin members 54 also are exposed and extend outwardly from end face 64A of the associated connector member 14. Upon application of heat to these extending portions of the pin members, the heat is transmitted by conduction along the length of the body of the pin members to the pointed ends thereof for melting the solder. The melted solder flows among the ends of the strands of the corresponding wire and upon solidification forms a soldered connection between the wire 26 and the pin member 22 or 54, as best seen in FIG. 6. The heat may be applied in any convenient manner as, for example, by the heating pad 66 illustrated in FIG. 2. It will be understood that the pin members are made of a suitable heat and electrically conducting material, for example a metal, and the connector members 12 and 14 are made from a suitable insulating material.

After the soldered connections are formed, connector members 12 and 14 are brought together with end faces 64 and 64A, respectively, being in abutting face-to-face relationship. Plugs 50 of pin members 22 are inserted in the corresponding sockets 52 of pin members 54 and are in electrical contact therewith and, for this purpose, the sides of the sockets may be provided with slits 68 permitting resilient engagement of the plugs 50. Cable 16 is now connected to cable 18, in electrically conducting relationship, and wires 26 of cable 16 are electrically connected to corresponding wires 26 of cable 18. To prevent the connector members 12 and 14 from separating, the nut 20 is provided with a shoulder 72 which engages shoulder 74 of connector member 14 to retain the connector members together. Nut 20 is internally threaded and the threads are adapted to be screwed onto the outer threads of connector member 12.

The invention is also applicable to connect two individual stranded wires to each other. For this purpose, the pointed end 48 of a pin member 22 is inserted endwise into a stranded wire 26 to provide an end connector for said wire. Heat is applied to the pin member for melting the solder on the pointed end and thereby form a soldered connection of the pin member to wire 26. In a similar manner a pin member 54 is connected to another stranded wire 26 and the pin members are connected to each other by their plug and socket ends, respectively. In this way the two wires are in electrically conducting relation with each other with soldered connections between the wire and its respective pin member without the necessity of stripping any insulation from the wire in making said soldered connections.

If desired, a single wire 26 may be connected to a cable by providing said wire with a soldered terminal connector constituted by a pin member 22 or 54 and providing an associated wire of the cable with a mating pin member in a similar manner as previously described with respect to a single wire. It will be seen that pin member 22 or 54 provides an end or terminal connector for its associated stranded wire.

As seen in FIG. 3, the wires 26 of a cable are arranged in an outer circle with two wires being provided inwardly of said circle. It will be understood that the insulating sheath 58 of each of the wires 26 is of such a diameter, as shown in FIG. 2, that the outer surface of each sheath is in contact with the outer surface of the adjacent sheath and a tight bundle of wires 26 are provided within the insulating sheath 28 of the cable. Because of this compact arrangement of the wires they may become twisted or rotate about the longitudinal axis of the cable when placed in the cable and assume a position which is different from what is shown in FIG. 3. In order to accommodate this change of position of the individual wires to permit alignment of the associated pin members with the corresponding wires, respectively, pin members 22A are mounted in the previously mentioned plug 24 which is rotatable within the body of connector member 12 along the longitudinal axis thereof. Similarly, the inwardly disposed pins 54A are also mounted in a rotatable plug member 24 in connector member 14 so that the inwardly disposed pin members of each of the connector members may be rotated with respect to the circular row of pin members to align the pin members with the corresponding wires of the cable.

As shown in FIG. 1, cable 16 is provided with a marking 76 and connector member 12 is provided with a corresponding marking 78 to assist in aligning cable 16 with connector member 12. Connector member 12 is provided with a marking 80 and connector member 14 is provided with a corresponding marking 82 to permit said members to be aligned with each other. Connector member 14 is also provided with a marking 84 and cable 18 is provided with a corresponding marking 86 to permit alignment of connector member 14 with said cable. In this manner proper alignment and assembly of the cables and connector members are facilitated.

It will be apparent from the above that the elongated pin members 22 and 54 are made of electrically conducting material and are of one-piece construction with their opposite ends in axial alignment.

While we have shown and described the preferred embodiments of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What we claim is:

1. A connector for a pair of cables each having a plurality of groups of stranded wires, one of said groups of wires being disposed radially inwardly of another of said groups, said connector comprising a pair of connector members for said cables, each of said connector members having a terminal member for each of the stranded wires in the companion cable, said terminal members being arranged in groups and positioned corresponding to the positions of the stranded wires of the respective groups, of the companion cable, said group of terminal members corresponding to said inwardly arranged group of stranded wires being mounted for movement with respect to the longitudinal axis of the companion cable to facilitate the alignment of the terminal members with the corresponding stranded wires of the companion cable.

2. A connector for a pair of cables each having a plurality of stranded wires arranged in a circle with a pair of said wires being disposed inwardly of said circle, said connector comprising a pair of connector members for said cables, each of said connector members having an end face and a plurality of terminal members corresponding in number to the number of stranded wires provided in each of said cables and arranged in positions corresponding to the positions of said stranded wires, each of said terminal members having a pointed end provided with solder and adapted to be inserted endwise into a corresponding stranded wire of a companion cable, the other end of each of said terminal members being exposed at the end face of the companion connector member to permit the application of heat to said other ends to melt said solder and form a soldered connection between said terminal members and the corresponding stranded wires of the companion cable, said other ends of the terminal members having cooperating parts, respectively, for connecting corresponding terminal members, respectively, of said connector members together with said end faces of said connector members in face-to-face abutting relation, said par of terminal members of each of said connector members corresponding to said pairs of wires, respectively, being mounted for rotation in its associated connector member to facilitate the alignment of said terminal members with the corresponding stranded wires of the companion cable.

References Cited in the file of this patent

UNITED STATES PATENTS

| | | |
|---|---|---|
| 1,188,056 | Faile | June 20, 1916 |
| 1,484,202 | Baker | Feb. 19, 1924 |
| 2,588,172 | Snavely et al. | Mar. 4, 1952 |
| 2,759,161 | Berg | Aug. 14, 1956 |
| 2,896,186 | Hardmark | July 21, 1959 |
| 2,952,832 | Chandler | Sept. 13, 1960 |

FOREIGN PATENTS

| | | |
|---|---|---|
| 692,572 | France | Aug. 4, 1930 |